(12) United States Patent
Rothman et al.

(10) Patent No.: US 7,203,808 B2
(45) Date of Patent: Apr. 10, 2007

(54) ISOLATION AND PROTECTION OF DISK AREAS CONTROLLED AND FOR USE BY VIRTUAL MACHINE MANAGER IN FIRMWARE

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 496 days.

(21) Appl. No.: 10/803,950

(22) Filed: Mar. 19, 2004

(65) Prior Publication Data

US 2005/0210180 A1 Sep. 22, 2005

(51) Int. Cl.
*G06F 12/00* (2006.01)
(52) U.S. Cl. .......................... 711/163; 711/6; 711/114; 717/138; 718/1
(58) Field of Classification Search ................ 711/163, 711/6, 114; 717/138; 718/1
See application file for complete search history.

(56) References Cited

U.S. PATENT DOCUMENTS

| | | | | |
|---|---|---|---|---|
| 5,396,614 A * | 3/1995 | Khalidi et al. | ............... | 711/118 |
| 5,459,869 A * | 10/1995 | Spilo | ........................... | 719/324 |
| 5,991,856 A * | 11/1999 | Spilo et al. | ................. | 711/147 |
| 6,496,847 B1 * | 12/2002 | Bugnion et al. | ............... | 718/1 |
| 2004/0230794 A1 * | 11/2004 | England et al. | ............. | 713/164 |
| 2005/0081212 A1 * | 4/2005 | Goud et al. | ................. | 718/107 |
| 2005/0114610 A1 * | 5/2005 | Robinson et al. | ........... | 711/152 |

* cited by examiner

*Primary Examiner*—Stephen C. Elmore
(74) *Attorney, Agent, or Firm*—Venable LLP; Caroline J. Swindell

(57) ABSTRACT

A region on a memory device may be provided, where the region is protected from direct access by the operating system without the use of a hardware controller. Access may be provided through firmware with the use of a virtual machine manager. The system may be used to provide a software controlled RAID without the use of a hardware controller.

26 Claims, 4 Drawing Sheets

ISOLATION AND PROTECTION OF DISK AREAS CONTROLLED AND FOR USE BY VIRTUAL MACHINE MANAGER IN FIRMWARE

BACKGROUND OF THE INVENTION

Currently only a controller-based technology allows one to reserve areas of specific types of computer accessible media for firmware usage. This poses issues regarding the prerequisite need of a specific type of controller which supports host protected access (HPA), since not all systems have a controller that supports HPA.

DEFINITIONS

Components/terminology used herein for one or more embodiments of the invention are described below:

In some embodiments, "computer" may refer to any apparatus that is capable of accepting a structured input, processing the structured input according to prescribed rules, and producing results of the processing as output. Examples of a computer may include: a computer; a general-purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer may have a single processor or multiple processors, which may operate in parallel and/or not in parallel. A computer may also refer to two or more computers connected together via a network for transmitting or receiving information between the computers. An example of such a computer may include a distributed computer system for processing information via computers linked by a network.

In some embodiments, "a machine-accessible medium" may refer to any storage device used for storing data accessible by a computer. Examples of a machine-accessible medium may include: a magnetic hard disk; a floppy disk; an optical disk, like a compact disk read-only memory (CD-ROM) or a digital video disk (DVD); a magnetic tape; and a memory chip.

In some embodiments, "software" may refer to prescribed rules to operate a computer. Examples of software may include: code segments; instructions; computer programs; and programmed logic.

In some embodiments, a "computer system" may refer to a system having a computer, where the computer may comprise a machine-accessible medium embodying software to operate the computer.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF VARIOUS EMBODIMENTS OF THE PRESENT INVENTION

Various embodiments of the invention are discussed in detail below. While specific exemplary embodiments are discussed, it should be understood that this is done for illustration purposes only. A person skilled in the relevant art will recognize that other components and configurations can be used without parting from the spirit and scope of the invention.

Figure 1:
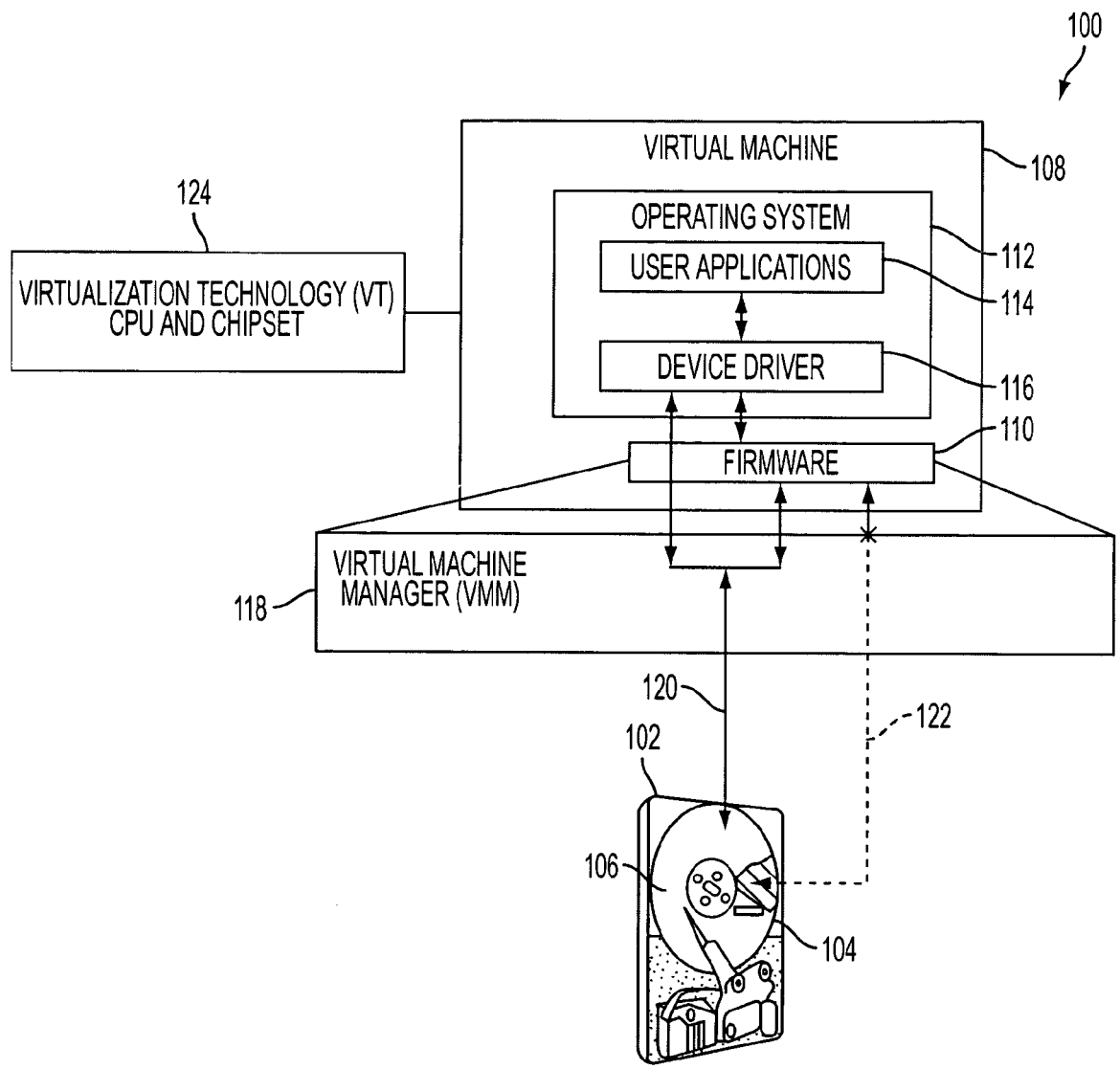
FIG. 1 depicts an exemplary system of an exemplary embodiment of the present invention.

In an exemplary embodiment, the present invention may use a computer's firmware rather than a hardware disk-controller to provide both the isolation and protection of a region of a hard disk for use by the firmware. While described in terms of a hard disk, the invention is not to be understood as being limited to application thereto, but rather, the invention may be applicable to memory devices, in general. FIG. 1 depicts an exemplary system 100 of an exemplary embodiment of the present invention. The system 100 may comprise a hard disk 102 having a protected area 104 and a generally accessible area 106. The system 100 may also comprise a virtual machine 108, which may comprise firmware 110 and an operating system 112. The operating system 112 may comprise various user applications 114 and one or more device drivers 116. The device drivers 116 may include, for example, network, video, disk, or other memory device drivers. The system 100 may also comprise a virtual machine manager (VMM) 118, which may be launched from the firmware 110 when the system 100 boots up.

The VMM 118 may provide direct access to the generally accessible area 106 of the hard disk 102 to the operating system 112, as illustrated 120. In providing access to the generally accessible area 106, the VMM functions analogously to a hardware disk controller (or, more generally, a memory device controller). Only the firmware 110, however, has direct access to the protected area 104 of the hard disk 102, as illustrated by arrow 122.

The VMM 118 may be implemented with virtualization technology (VT), which may allow an exemplary embodiment of the system of the present invention to function during the early part of the computer system's initialization. Accordingly, a VT enabled central processing unit (CPU) and chipset 124 may replace a conventional platform hardware system of providing hard disk access.

One possible application of the system 100 may be to provide a redundant array of independent disks (RAID) controlled by software only (also referred to herein as a "software RAID") from the firmware running on the host CPU. In a software RAID application, the firmware 108 may reserve multiple areas on one or more hard disks. Each protected area may then act as one disk in a RAID.

Another possible application may be to deprecate operating system (OS)-specific file-system support in firmware to use magnetic media as a data device, without requiring specific controller support in the system.

Another possible application may be the ability to have extensibility modules in this protected region for additional pre-boot support without encumbering flash overhead, because flash space is expensive. For example, an area on the computer accessible media may be established, which may be the domain of the firmware and may thus be protected from read/write capability from the operating system, without requiring specific controller support in the platform. This may also enable the ability to provide added flash-like functionality at no additional cost.

Another possible application may be the ability to save critical file-system structures to the protected region of the memory device for the recovery of broken boot structures that could have been affected by a virus or malfunctioning program. The system may then be restored to a "last known working" configuration.

Another possible application may be the ability to read and store data in the protected region of the memory device in an OS-independent fashion. This may allow for critical system core dumps to take place in the pre-boot process without needing native file-system support for the media.

Another possible application may be the ability to provide a software-only means of establishing memory device region ownership, and may thus eliminate the dependencies of specific functionality being present in varying memory device controllers.

Another possible application may be the use of the protected area for memory device-based security in trusted systems. Trustworthy computing architectures assume that there are only partitioned portions of memory and all content must be encrypted by the host CPU prior to writing to disk. Having the ability for the VMM to apply successive transformations, such as encryption, to the data prior to an actual write operation may provide additional confidentiality in trusted systems.

In an exemplary embodiment, the present invention may allow for the memory device subsystem to be self-healing and self-correcting.

Figure 2:
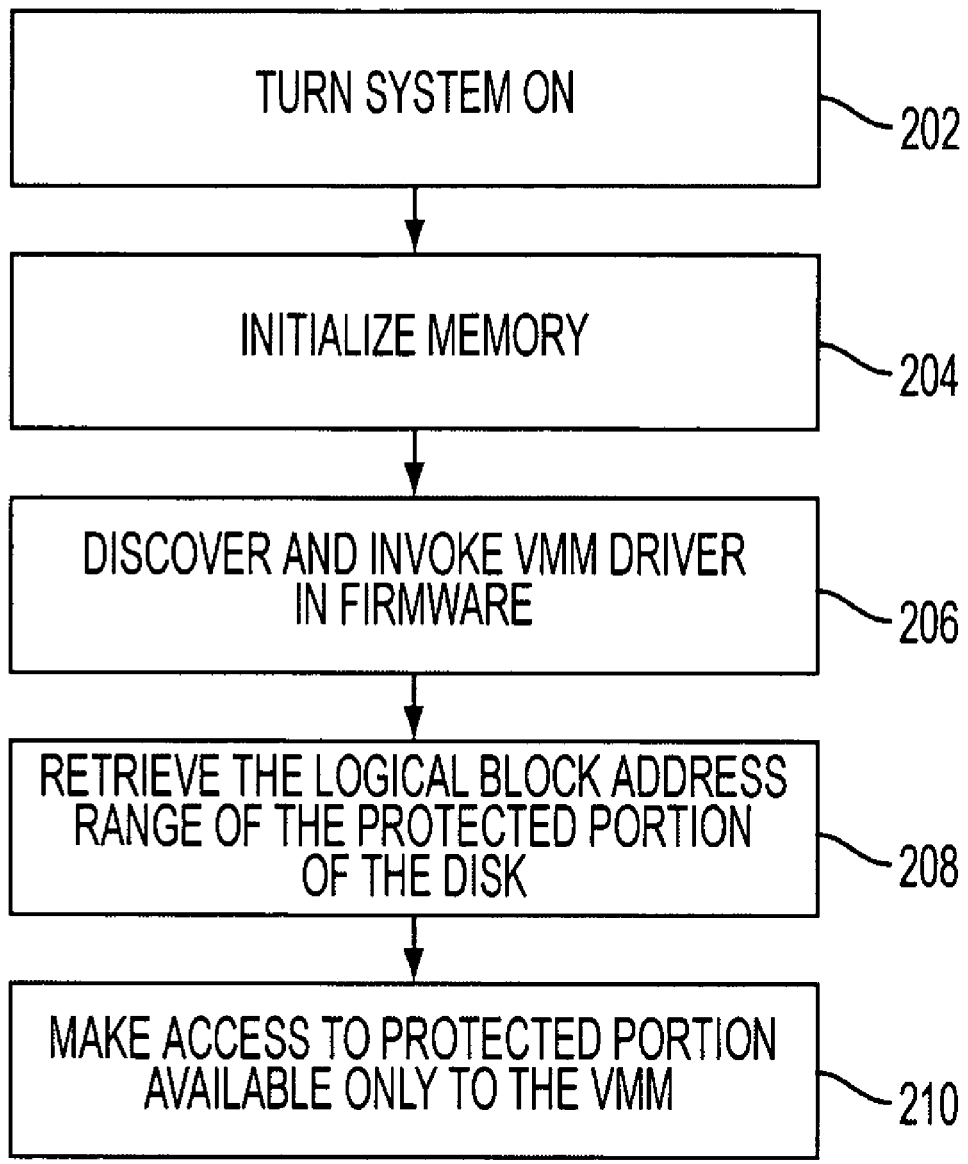
FIG. 2 depicts an exemplary embodiment of a method of the present invention.

FIG. 2 depicts an exemplary embodiment of a method of the present invention. When the system is turned on in block 202, memory may be initialized in block 204. Then, the VMM driver may be discovered and invoked in block 206. The VMM driver may be a platform resource that may be loaded from the flash memory. The VMM may then retrieve the logical block address (LBA) range of the protected area of the disk or other memory device in block 208. The LBA range may be a set size, or may be determined according to a percentage of the memory device size, or may be user-initiated. The VMM may exclusively provide access to the protected area independently of any memory device controller in block 210. The VMM may emulate a drive interface to the operating system and may prevent access to the protected region.

Figure 3:
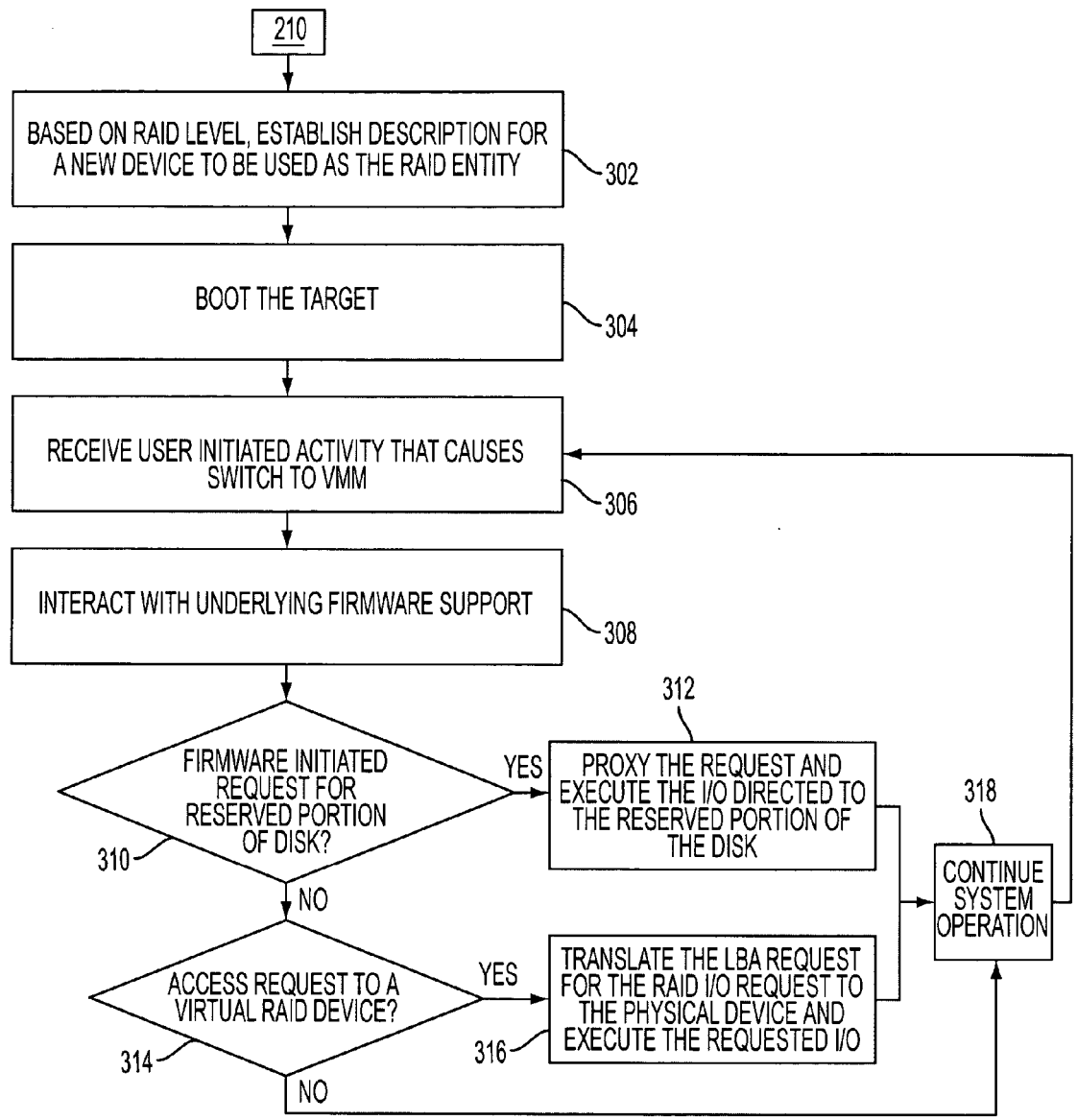
FIG. 3 depicts a method of providing a software redundant array of independent disks (RAID) according to an exemplary embodiment of the present invention.

FIG. 3 depicts a method of providing a software RAID according to an exemplary embodiment of the present invention. After block 210, while the system is still starting up, the VMM may establish a description for a new device to be used as the RAID entity in block 302. For example, multiple hard disks may be abstracted into one large drive. The VMM may also emulate a mirrored RAID, a striped RAID, or a combination mirror-striped RAID. Then, the target system may be booted in block 304. Once the system is operating, the system may receive a user-initiated activity that may cause the system to switch to the VMM in block 306. Such an activity may include, for example, a back-up operation to the RAID device. When the request is received, the operating system may interact with the underlying firmware support, i.e., the VMM-created RAID, in block 308. Then, if the firmware initiates a request for the protected portion of the disk (or other memory device), in block 310, the VMM may proxy the request for the protected area and may execute the request in block 312. If the operating system requests access to the RAID device in block 314, the VMM may translate a logical block address (LBA) request for the RAID to the physical hard disk (or other memory device) protected areas and may execute the RAID request in block 316. The system may then continue operation in block 318 until another VMM-related activity is received in block 306, or until the system is shut down.

Figure 4:
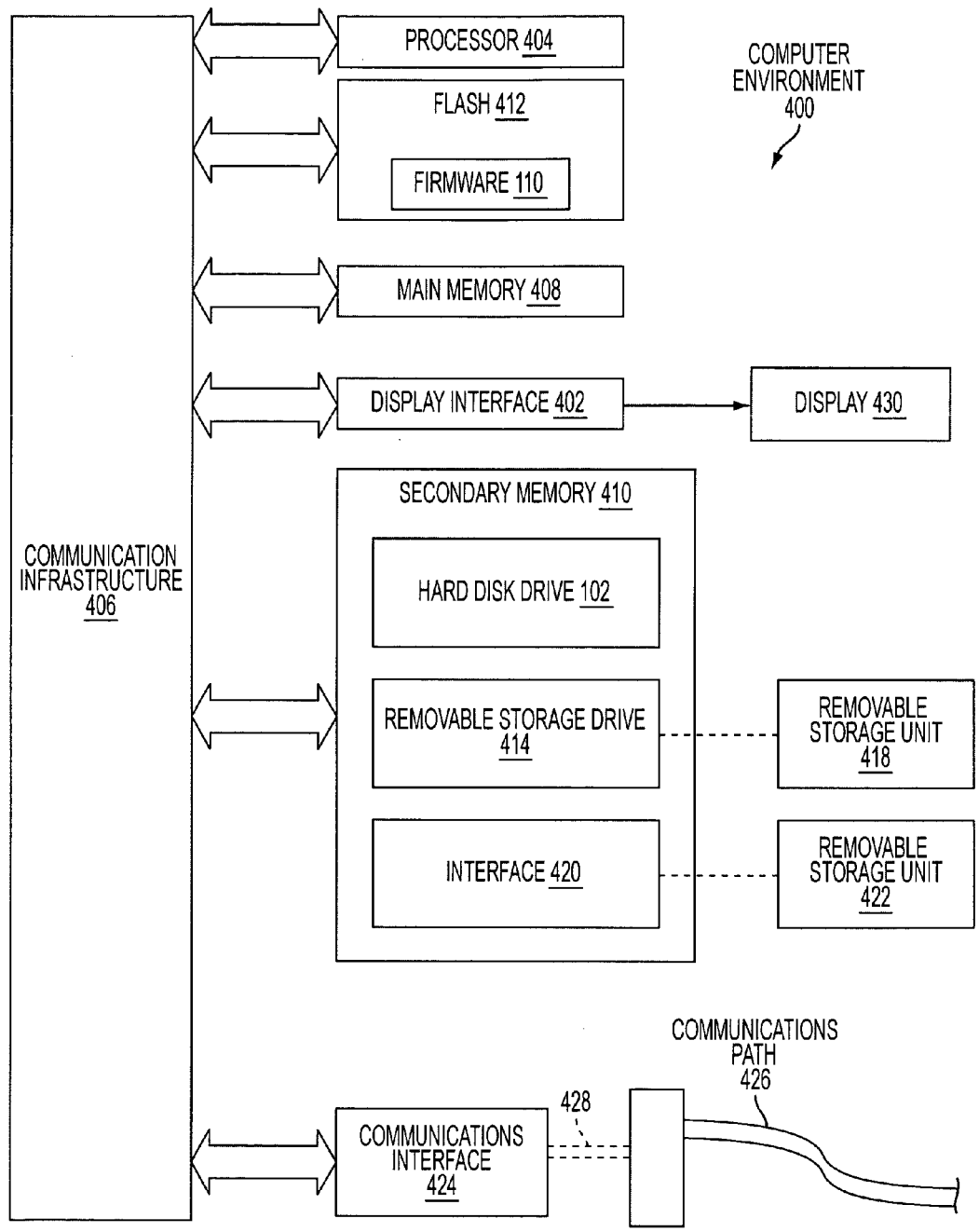
FIG. 4 depicts a conceptual block diagram of a computer system that may be used to implement an embodiment of the invention.

Embodiments of the present invention (i.e., the components of FIGS. 1–3 or any part thereof) may be implemented using hardware, software or a combination thereof and may be implemented in one or more computer systems or other processing systems. In fact, in one embodiment, the invention may comprise one or more computer systems capable of carrying out the functionality described herein. An example of a computer system 400 is shown in FIG. 4. The computer system 400 may include one or more processors, such as processor 404, and firmware 110. The firmware 110 may be inside of a FLASH device 412 (e.g., a non-volatile store coupled to the platform motherboard). The processor 404 may be connected to a communication infrastructure 406 (e.g., a communications bus, cross over bar, or network). Various software embodiments may be described in terms of this exemplary computer system. After reading this description, it will become apparent to a person skilled in the relevant art(s) how to implement the invention using other computer systems and/or computer architectures.

Computer system 400 may include a display interface 402 that may forward graphics, text, and other data from the communication infrastructure 406 (or from a frame buffer not shown) for display on the display unit 430.

Computer system 400 may also include a main memory 408, preferably random access memory (RAM), and may also include a secondary memory 410. The secondary memory 410 may include, for example, a hard disk drive 102 and/or a removable storage drive 414, representing a floppy disk drive, a magnetic tape drive, an optical disk drive, etc, but which is not limited thereto. The removable storage drive 414 may read from and/or write to a removable storage unit 418 in a well-known manner. Removable storage unit 418, may represent a floppy disk, magnetic tape, optical disk, etc. which may be read by and written to by removable storage drive 414. As will be appreciated, the removable storage unit 418 may include a computer usable storage medium having stored therein computer software and/or data.

In alternative embodiments, secondary memory 410 may include other similar means for allowing computer programs or other instructions to be loaded into computer system 400. Such means may include, for example, a removable storage unit 422 and an interface 420. Examples of such may include, but are not limited to, a program cartridge and cartridge interface (such as that found in video game devices), a removable memory chip (such as an EPROM, or PROM) and associated socket, and/or other removable storage units 422 and interfaces 420 that may allow software and data to be transferred from the removable storage unit 422 to computer system 400.

Computer system 400 may also include a communications interface 424. Communications interface 424 may allow software and data to be transferred between computer system 400 and external devices. Examples of communications interface 424 may include, but are not limited to, a modem, a network interface (such as an Ethernet card), a communications port, a PCMCIA slot and card, etc. Software and data transferred via communications interface 424 may be in the form of signals 428, which may be, for example, electronic, electromagnetic, optical or other signals capable of being received by communications interface 424. These signals 428 may be provided to communications interface 424 via a communications path (i.e., channel) 426. This channel 426 may carry signals 428 and may be implemented using wire or cable, fiber optics, a phone line, a cellular phone link, an RF link and/or other communications channels.

The terms "computer program medium" and "computer usable medium" may be used to generally refer to media such as, but not limited to, removable storage drive 414 and a hard disk installed in hard disk drive 102. These computer program media may act as means for providing software to computer system 400.

Computer programs (also called computer control logic) may be stored in main memory 408 and/or secondary memory 410. Computer programs may also be received via communications interface 424. Such computer programs, when executed, may enable the computer system 400 to perform the features of the present invention as discussed herein. In particular, the computer programs, when executed, may enable the processor 404 to perform the present invention in accordance with the above-described embodiments. Accordingly, such computer programs may represent controllers of the computer system 400.

In an embodiment where the invention is implemented using software, the software may be stored in a computer program product and loaded into computer system 400 using, for example, removable storage drive 414, hard drive 102 or communications interface 424. The control logic (software), when executed by the processor 404, may cause the processor 404 to perform the functions of the invention as described herein.

In another embodiment, the invention may be implemented primarily in hardware using, for example, hardware components such as application specific integrated circuits (ASICs). Implementation of the hardware state machine so as to perform the functions described herein will be apparent to persons skilled in the relevant art(s). As discussed above, the invention is implemented using any combination of hardware, firmware and software.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A system comprising:
    an operating system adapted to operate on a processor;
    a memory device having a protected area, wherein said protected area is not directly accessible to said operating system;
    firmware coupled to said memory device;
    a virtual machine manager installed in said firmware operative to provide said operating system access to said protected area independently of any hardware controller of said memory device.

2. The system of claim 1, further comprising a plurality of protected areas on said memory device.

3. The system of claim 2, wherein said system functions as a redundant array of independent disks (RAID).

4. The system of claim 1, wherein said memory device comprises a hard disk.

5. The system of claim 1. further comprising a known working configuration stored in said protected area, wherein said known working configuration comprises critical file-system structures.

6. The system of claim 1, wherein said firmware provides operating system-specific file-system support.

7. The system of claim 1, further comprising extensibility modules stored in said protected area for pre-boot support.

8. The system of claim 1, wherein said firmware provides operating system-independent file-system support.

9. A method comprising:
    (a) protecting an area on a memory device;
    (b) providing a virtual machine manager (VMM) in firmware coupled to said memory device; and
    (c) providing access to said protected area through said VMM independently of any hardware controller of said memory device.

10. The method of claim 9, wherein (c) further comprises:
    proxying an access request for said protected area with said VMM; and
    executing said access request to said protected area with said VMM.

11. The method of claim 9, wherein (a) further comprises protecting a plurality of areas on said memory device.

12. The method of claim 11, further comprising
    (d) using said plurality of protected areas as a redundant array of independent disks (RAID).

13. The method of claim 12, wherein (c) further comprises:
    translating a logical block address (LBA) request for said RAID to said plurality of protected areas; and
    executing said LBA request.

14. The method of claim 9, further comprising:
    (d) storing a known working configuration in said protected area, wherein said known working configuration comprises critical file-system structures; and
    (e) using said known working configuration when a computer adapted to execute said method is unable to boot properly.

15. The method of claim 9, further comprising:
    (d) providing operating system-specific file-system support with said firmware.

16. The method of claim 9, further comprising:
    (d) storing extensibility modules in said protected area for pre-boot support.

17. The method of claim 9, further comprising:
    (d) providing operating system-independent file-system support with said firmware.

18. A machine-accessible medium containing code that, when executed by a computing platform, causes the computing platform to perform a method comprising:
    (a) protecting an area on a memory device;
    (b) using a virtual machine manager (VMM) coupled to said memory device; and
    (c) providing access to said protected area through said VMM independently of any hardware controller of said memory device.

19. The machine-accessible medium of claim 18, wherein (c) further comprises:
    proxying an access request for said protected area with said VMM; and
    executing said access request to said protected area with said VMM.

20. The machine-accessible medium of claim 18, wherein (a) further comprises reserving a plurality of areas on said memory device.

21. The machine-accessible medium of claim 20, further containing code that, when executed by a computing platform, causes said method to further comprise:
   (d) using said plurality of protected areas as a redundant array of independent disks (RAID).

22. The machine-accessible medium of claim 21, wherein (c) further comprises:
   translating a logical block address (LBA) request for said RAID to said protected areas; and
   executing said LBA request.

23. The machine-accessible medium of claim 18, further containing code that, when executed by a computing platform, causes said method to further comprise:
   (d) storing a known working configuration in said protected area, wherein said known working configuration comprises critical file-system structures; and
   (e) using said known working configuration when the computing platform is unable to boot properly.

24. The machine-accessible medium of claim 18, further containing code that, when executed by a computing platform, causes said method to further comprise:
   (d) providing operating system-specific file-system support with said firmware.

25. The machine-accessible medium of claim 18, further containing code that, when executed by a computing platform, causes said method to further comprise:
   (d) storing extensibility modules in said protected area for pre-boot support.

26. The machine-accessible medium of claim 18, further containing code that, when executed by a computing platform, causes said method to further comprise:
   (d) providing operating system-independent file-system support with said firmware.

* * * * *